(12) United States Patent
de Gooijer

(10) Patent No.: US 6,349,684 B1
(45) Date of Patent: Feb. 26, 2002

(54) CRANK-CONNECTING ROD MECHANISM

(75) Inventor: Lambertus Hendrik de Gooijer, Naarden (NL)

(73) Assignee: Gomecsys B.V. (NL)

( * ) Notice: Subject to any disclaimer, the term of this patent is extended or adjusted under 35 U.S.C. 154(b) by 0 days.

(21) Appl. No.: 09/700,635

(22) PCT Filed: Dec. 9, 1999

(86) PCT No.: PCT/NL99/00309

§ 371 Date: Nov. 16, 2000

§ 102(e) Date: Nov. 16, 2000

(87) PCT Pub. No.: WO99/63247

PCT Pub. Date: Dec. 9, 1999

(30) Foreign Application Priority Data

May 19, 1998 (NL) .............................................. 1009211

(51) Int. Cl.[7] .......................... F16H 21/36; F16H 21/30; F01B 9/02
(52) U.S. Cl. .................................... 123/78 F; 123/197.4
(58) Field of Search .......................... 123/197.4, 197.1, 123/78 F, 48 B

(56) References Cited

U.S. PATENT DOCUMENTS

| 4,073,196 A | * | 2/1978 | Dell | ........................ 123/197.1 |
|---|---|---|---|---|
| 4,932,373 A | * | 6/1990 | Carson | ..................... 123/197.4 |
| 5,732,673 A | * | 3/1998 | Mandella | ................. 123/197.4 |
| 5,908,014 A | | 6/1999 | Leithinger | ................ 123/78 F |

FOREIGN PATENT DOCUMENTS

| DE | 488 059 | 12/1929 |
| DE | 3420956 A1 | 6/1984 |
| EP | 0 063 725 A2 | 4/1982 |
| FR | 677 196 | 3/1930 |
| FR | 2 031 014 | 12/1969 |
| GB | 2 297 599 A | 2/1995 |
| NL | 8730 | 12/1921 |

* cited by examiner

Primary Examiner—Marguerite McMahon
(74) Attorney, Agent, or Firm—Westman, Champlin & Kelly, P.A.; Steven Koehler

(57) ABSTRACT

A crank-connecting rod mechanism for an internal combustion engine or the like comprising a shaft rotating around its axis, a first crank fixed to the shaft and a crank pin fixed to the first crank. A crank pin extends parallel to but at a first radial distance from the shaft. A second crank rotatably mounted onto the first crank pin is fixed to a second crank pin having an axis at a second radial distance from the axis of the first crank pin. A connecting rod is rotatably mounted on the second crank pin. Rotary means are provided to force the second crank to rotate relative to the first crank upon a rotation of the shaft.

22 Claims, 13 Drawing Sheets

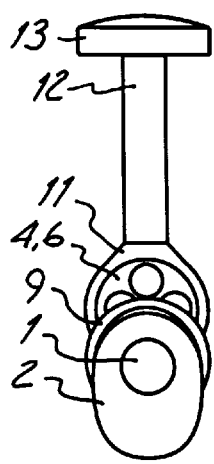
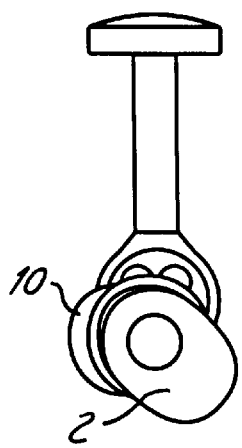
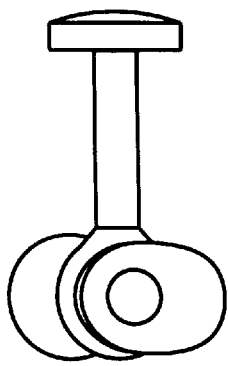
Fig. 4a    Fig. 4b    Fig. 4c
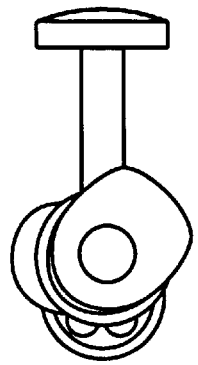
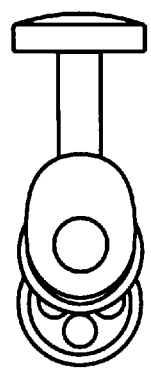
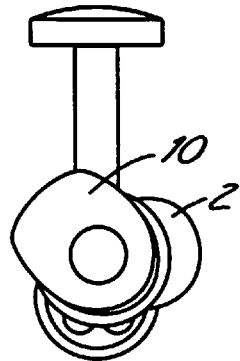
Fig. 4d    Fig. 4e    Fig. 4f
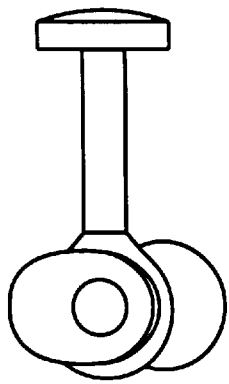
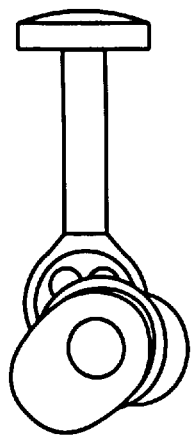
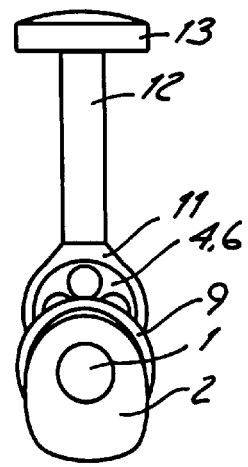
Fig. 4g    Fig. 4h    Fig. 4i

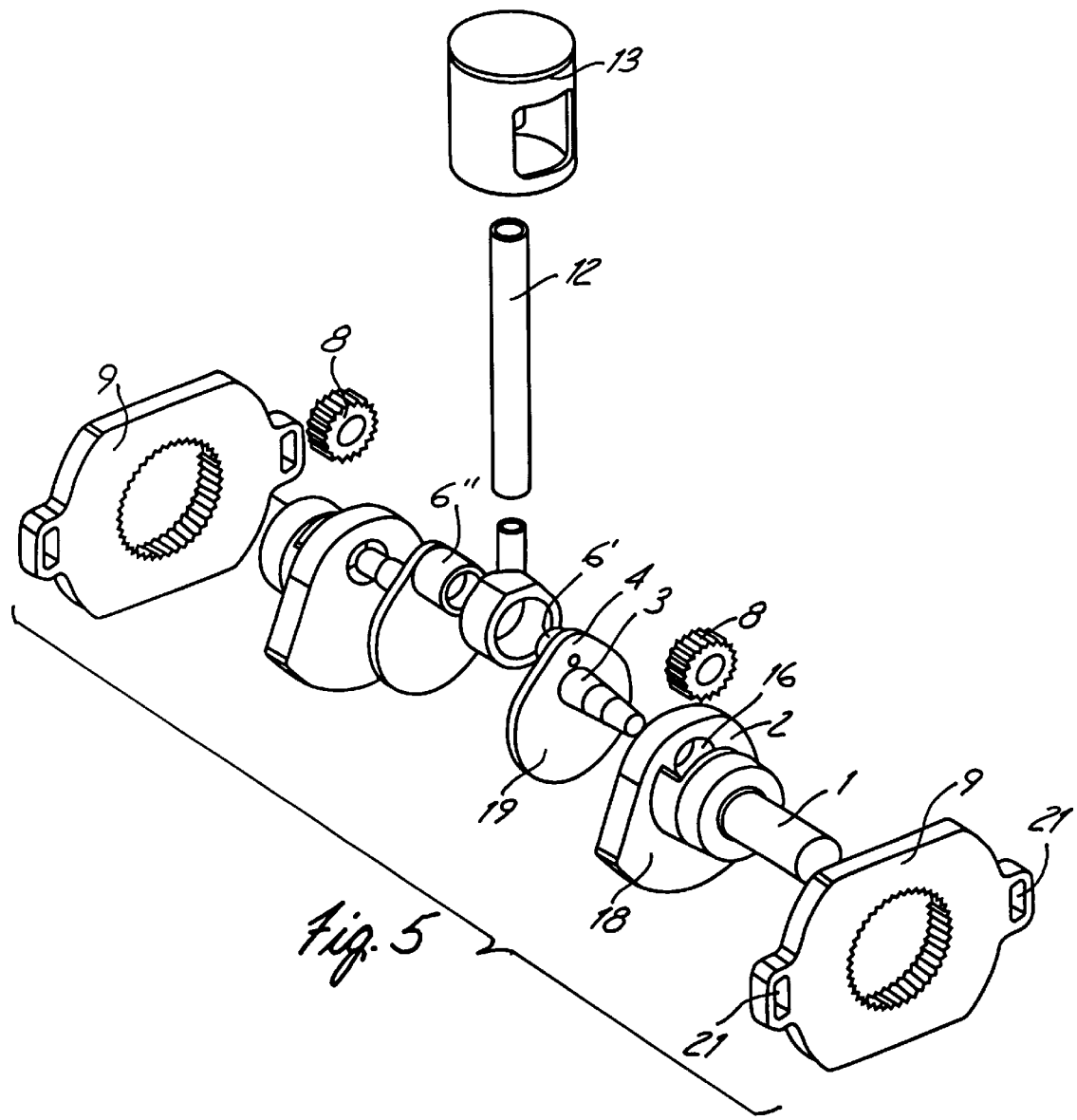

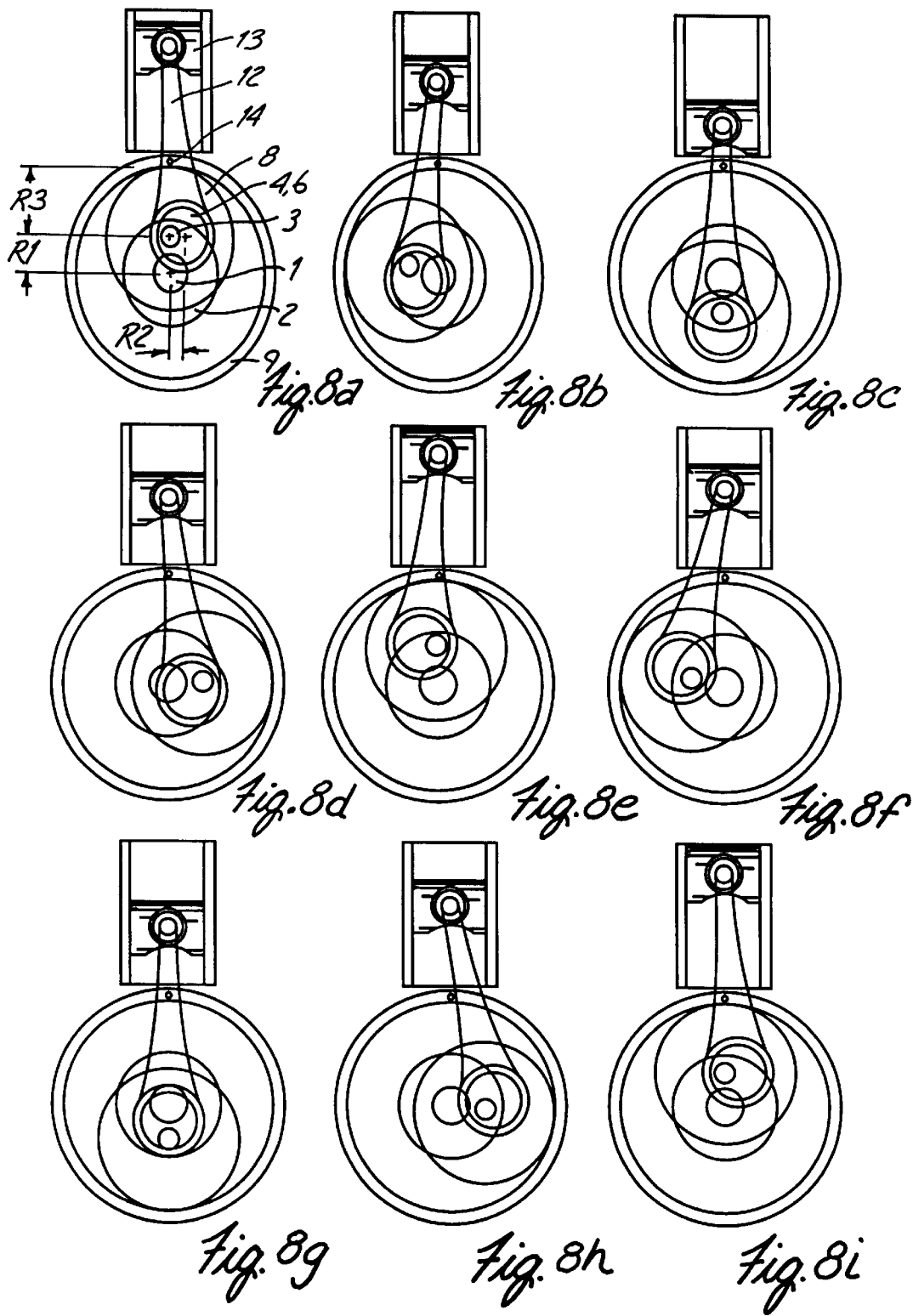

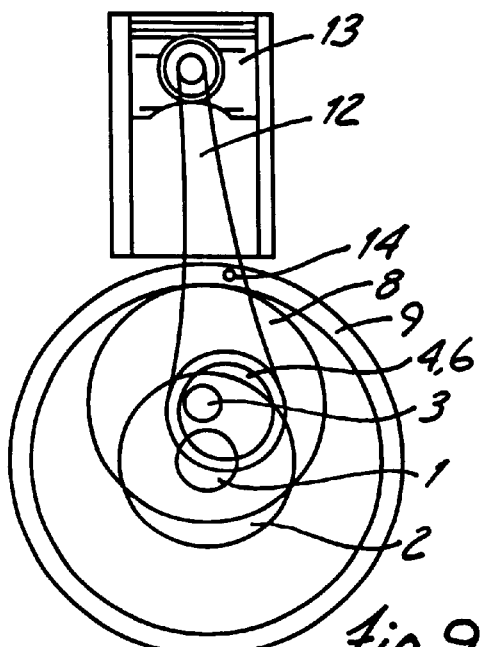
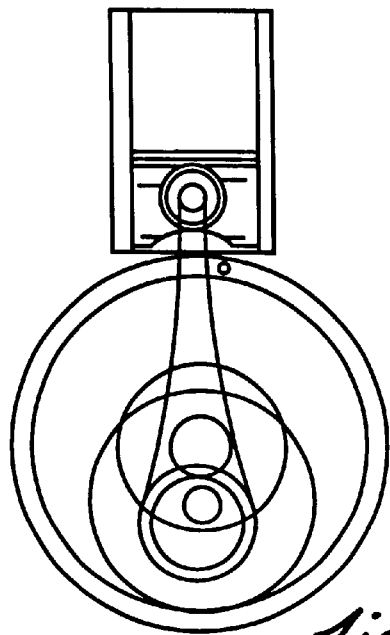
Fig. 9a
Fig. 9b
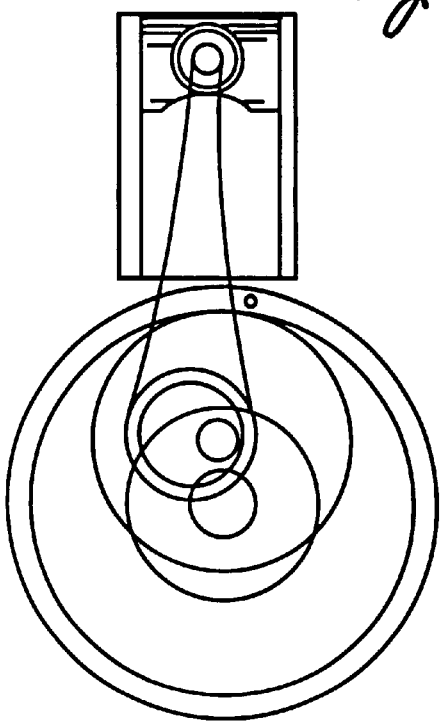
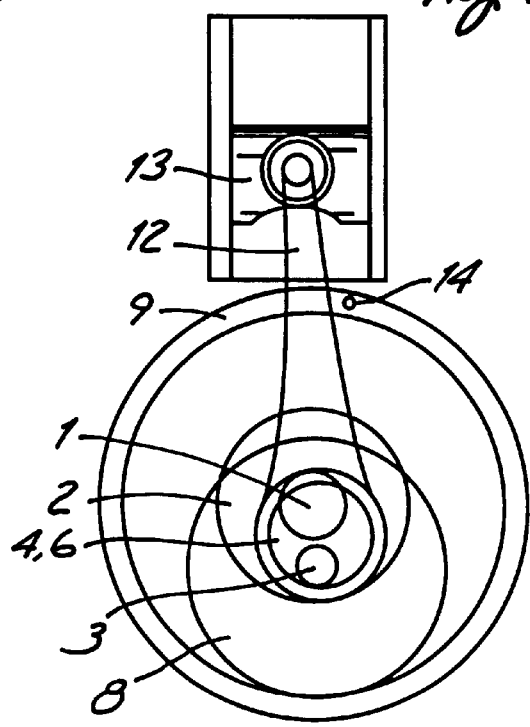
Fig. 9c
Fig. 9d

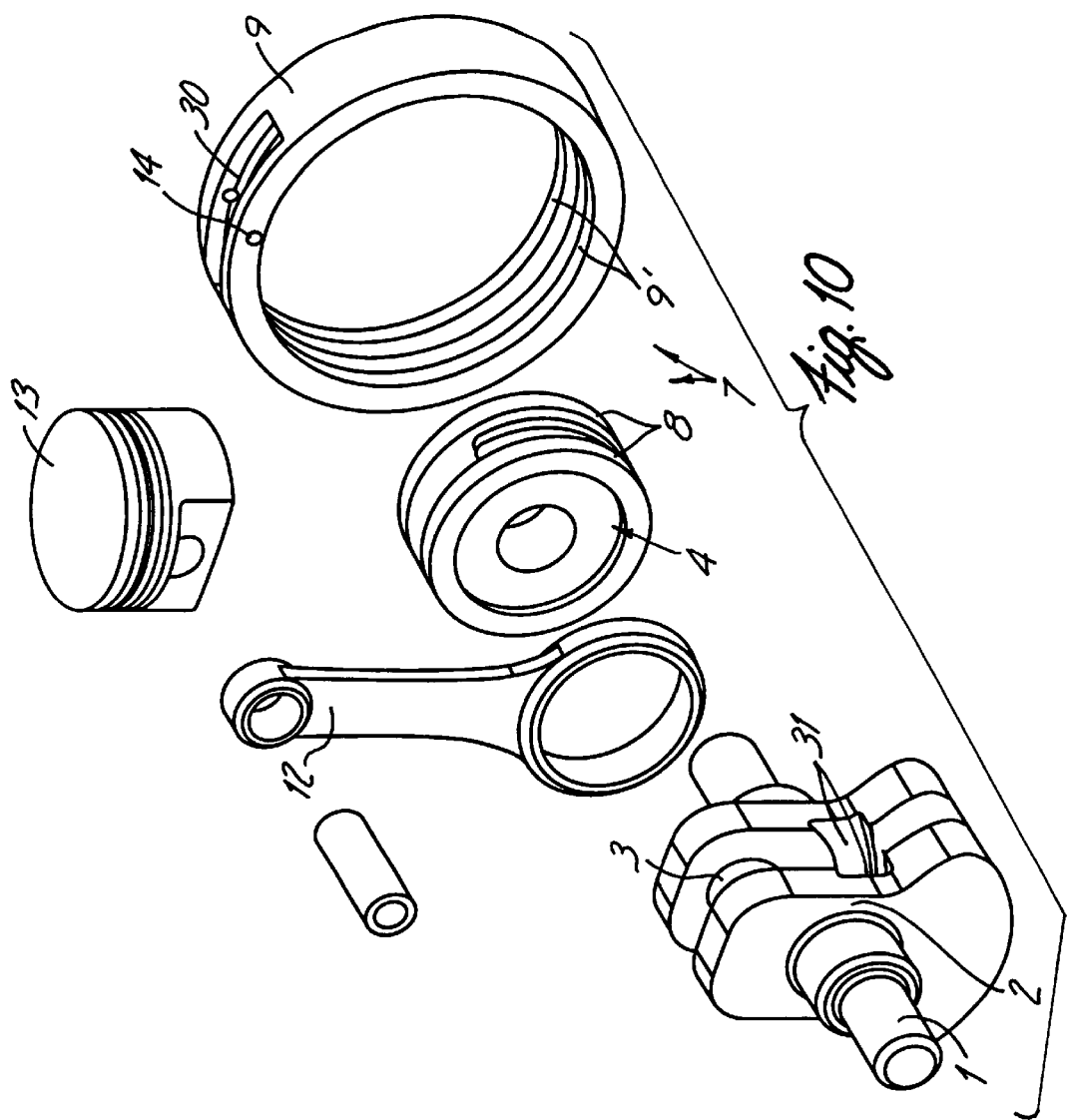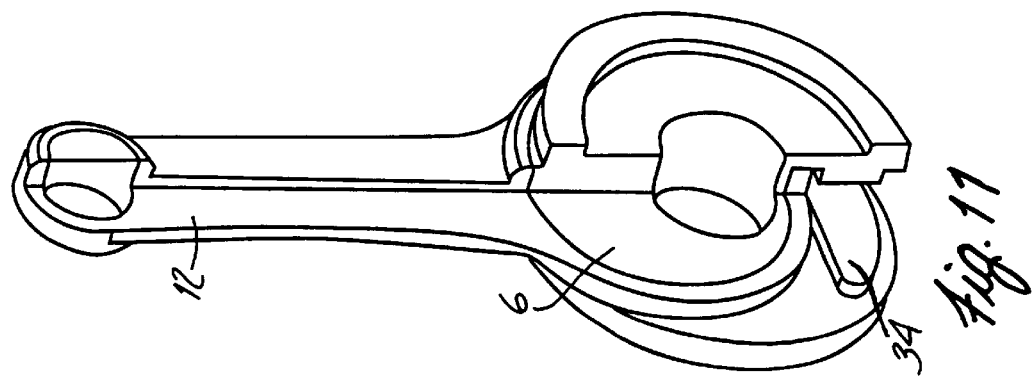

CRANK-CONNECTING ROD MECHANISM

This application is a national stage filing under 35 U.S.C. § 371 and is hereby claimed of International application PCT/NL99/00309, filed May 19, 1999 and published in English.

BACKGROUND OF THE INVENTION

The invention relates to a crank-connecting rod mechanism for an internal combustion engine or the like.

The present crankshaft as used in all standard piston engines is already several decades old and its principle has remained unchanged. Although constant refinements have resulted in a highly reliable and trouble-free crank mechanism, the mechanism clearly has its limitations.

SUMMARY OF THE INVENTION

The object of the present invention is to provide a crank-connecting rod mechanism which offers surprising new possibilities.

In order to accomplish that objective, the present invention provides a crank-connecting rod mechanism for an internal combustion engine or the like, which comprises a shaft rotating about its axis, a first crank fixed to said shaft, a crank pin fixed to said first crank, which extends parallel to but at a first radial distance from said shaft, a second crank rotatably mounted on the first crank pin, which is fixed to a second crank pin having an axis at a second radial distance from the axis of the first crank pin, a connecting rod which is rotatably mounted on the second crank pin, as well as rotary means to force the second crank to rotate relative to the first crank upon rotation of the shaft.

In certain uses, significant benefits can be obtained from the addition of an additional crank comprising rotary means which determine the rotation of the second crank relative to the first crank.

In the case of two-stroke engines, for example, it is advantageous if the rotary means are so arranged that the second crank rotates at the same speed, while in an opposite direction, as the first crank, in which case the first radial distance is preferably the same as the second radial distance.

The use of such a crank-connecting rod mechanism makes it possible to have the connecting rod move straight up and down, in that the two crank pins rotating in opposite directions neutralize each other's movements in a direction perpendicularly to the connecting rod whilst enhancing said movements in the direction of the connecting rod. The connecting rod thus has linear bearings. This offers several advantages. In the first place, hardly any transverse forces will occur between the piston and the cylinder wall (the so-called guideway forces), due to the fact that the connecting rod moves straight up and down. The risk of seizing pistons and the friction between piston wall and cylinder wall are thus reduced. Further, a close fit rather than the use of a piston spring could provide a seal between the piston and the cylinder, which reduces the need for lubrication. The mechanism can furthermore be completely balanced for each individual cylinder, so that a low-vibration operation is possible with a one-cylinder engine as well. The construction makes it possible to use a simple suction membrane, wherein the so-called "false volume" (between membrane and the underside of the piston) can be minimized, as a result of which suction and filling are enhanced. Further, a connecting rod which does not move outwards in a lateral direction enables a longer stroke of the piston, wherein the port design can be optimized. The suction volume can be influenced by means of a suitable selection of the diameter of the connecting rod, by which the compression/expansion ratio can be determined. Finally, the construction is very advantageous for an opposed cylinder arrangement, wherein a piston can be mounted on either side of the same connecting rod.

Another possibility which the crank-connecting rod mechanism according to the present invention offers is the adjustability of the compression ratio, which may be important in particular with four-stroke engines. Such adjustability can be achieved by rotating the second crank with respect to the first crank in the top dead center, which makes it possible to change the straight up-and-down movement. of the second crank pin into a more or less oblique movement of the second crank pin. This results in a position change of the bottom and the top dead center. The top dead center will be utilized in the lower part load ranges of the running internal combustion engine, as a result of which the final compression pressure can reach the correct level in spite of the low suction pressure. In the middle part load range up to atmospheric suction, the top dead center will have to be reduced so far that a normal compression ratio is reached.

Adjustment of the crank pins relative to each other can be easily effected when said rotary means comprises of at least two parts, a first part of which is rotatably mounted on the second shaft and fixedly connected to the second crank, and a second part which is in engagement with the first part and which is adjustable with respect to the crankcase. In a practical embodiment thereof, said first part is a gear and said second part is a internal ring gear, with which the first gear meshes. In that case, the ring gear can be adjusted through an angle upon transition to another load range during operation of the crank-connecting rod mechanism so as to adjust the movement of the second crank pin and thus of the bottom and the top dead center.

Another interesting use of the crank-connecting rod mechanism is possible with a four-stroke engine, where it can be used to achieve a different length ratio between the expansion stroke and the compression stroke. This can for example be achieved in that the rotary means are so arranged that the second crank rotates at half the speed, albeit an opposite direction, of the first crank, whereby preferably the first crank is positioned at 0° and the second crank is positioned at substantially 90° at the uppermost point of the compression stroke, so that the first and the second stroke are both positioned at substantially 180° at the end of the expansion stroke. A complete rotary cycle will comprise two revolutions of the first crank in that case, and the ratio between the expansion stroke and the compression stroke can be determined by selecting the first and the second radial distance.

This embodiment has a number of significant advantages:

In the first place it is possible to achieve a long expansion stroke in this manner, so as to maximize utilization of the expansion energy and minimize the pressure upon opening of the exhaust valve. The relatively large expansion ratio will result in an increase of the theoretic efficiency.

Also in this embodiment, the connecting rod makes a much straighter movement during the expansion stroke than usual, as a result of which the guideway forces are significantly reduced. This leads to reduced friction losses and thus to enhanced mechanical efficiency.

Due to the possibilities of using the high-pressure turbine/compressor (up to 3.5 bars) in combination with the adjustable top dead center of the piston, the same engine power can be achieved with a piston displacement of about 30% of that of a conventional engine which does not employ supercharging. As a result, the pumping losses during part load operation of the engine will be much smaller, so that the mechanical efficiency during part load operation is considerably enhanced. In one embodiment, wherein the piston stroke is adjustable, a low compression ratio can be selected when a high boost pressure is used, and a favorable gas exchange can take place, while the compression ratio can be increased and an increased gas residue can be recycled when a low boost pressure is used.

The piston travels at a lower speed at the end of the compression stroke, so that less pre-ignition is required.

Also during part load less pre-ignition is required, because) the final compression pressure remains high, due to the adjustable top dead center position of the piston.

When using a high-pressure turbine/compressor, it is possible to use a relatively small engine, as a result of which the weight of the engine can remain at the same level as that of the current engines in spite of the increased number of engine parts.

Based on the aforesaid advantages, an efficiency enhancement during part load of approx. 50–70% may be possible, while an overall efficiency enhancement of 30–50% can be realised with an average driving style.

BRIEF DESCRIPTION OF THE DRAWINGS

The invention will be explained in more detail hereafter with reference to the drawings, which show embodiments of the crank-connecting rod mechanism according to the invention.

FIGS. 4a–i are side views of the crank-connecting rod mechanism of FIG. 3, showing nine positions thereof during one revolution of the crankshaft.

FIG. 5 is an exploded view of a variant of the first embodiment of a crank-connecting rod mechanism according to the invention.

FIGS. 8a–i are views comparable to FIGS. 4a–i of another embodiment of the crank-connecting rod mechanism according to the invention for a four-stroke engine, showing nine positions thereof during two revolutions of the crankshaft.

FIGS. 9a–d show the crank-connecting rod mechanism of FIG. 5 in four different positions thereof, with the ring gear thereof slightly rotated.

FIG. 10 is an exploded view of a practical embodiment of the crank-connecting rod mechanism of FIGS. 8 and 9.

FIG. 11 is an enlarged, partially cut-away, perspective view of the connecting rod with the second crank of the crank-connecting rod mechanism of FIG. 10.

DETAILED DESCRIPTION OF THE ILLUSTRATIVE EMBODIMENTS

Figure 2:
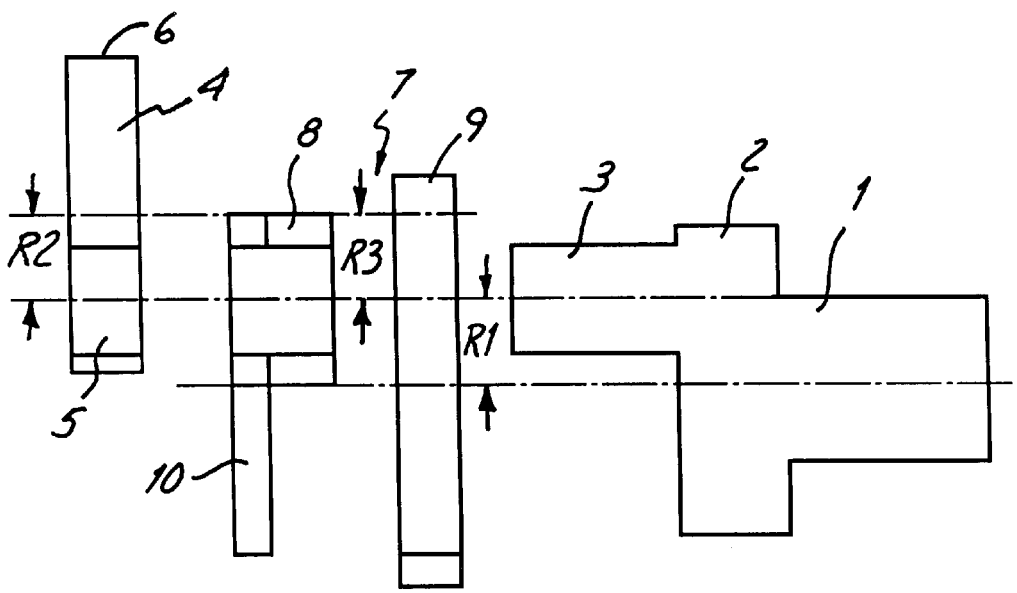
FIG. 2 is a longitudinal sectional view of the parts of FIG. 1.
Figure 1:
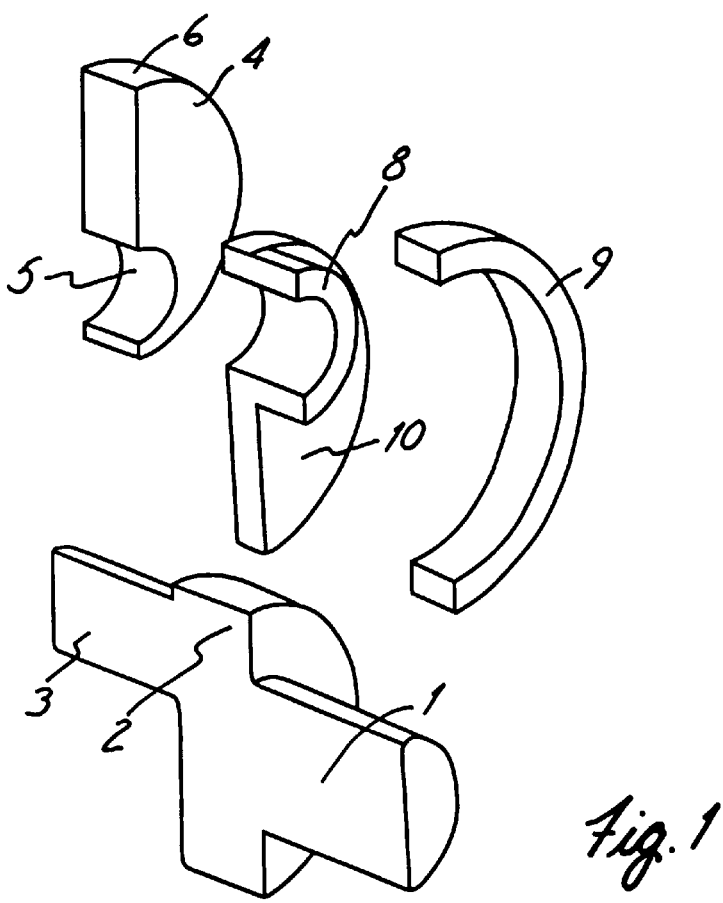
FIG. 1 is a perspective exploded view of a number of parts of a first embodiment of the crank-connecting rod mechanism according to the invention in longitudinal sectional view thereof.

FIGS. 1 and 2 show the principle of the crank-connecting rod mechanism according to the invention in very schematic form. The mechanism comprises a shaft 1, which is rotatably mounted in bearings (not shown), whereby it is capable of rotation about its axis. A first crank 2 is formed on said shaft 1, in this embodiment in the form of a concentric disc, which eccentrically supports a first crank pin 3 which extends parallel to shaft 1, but which projects from the other side of first crank 2. The axis of first crank pin 3 is located at a radial distance $R_1$ from the axis of shaft 1.

Figure 3:
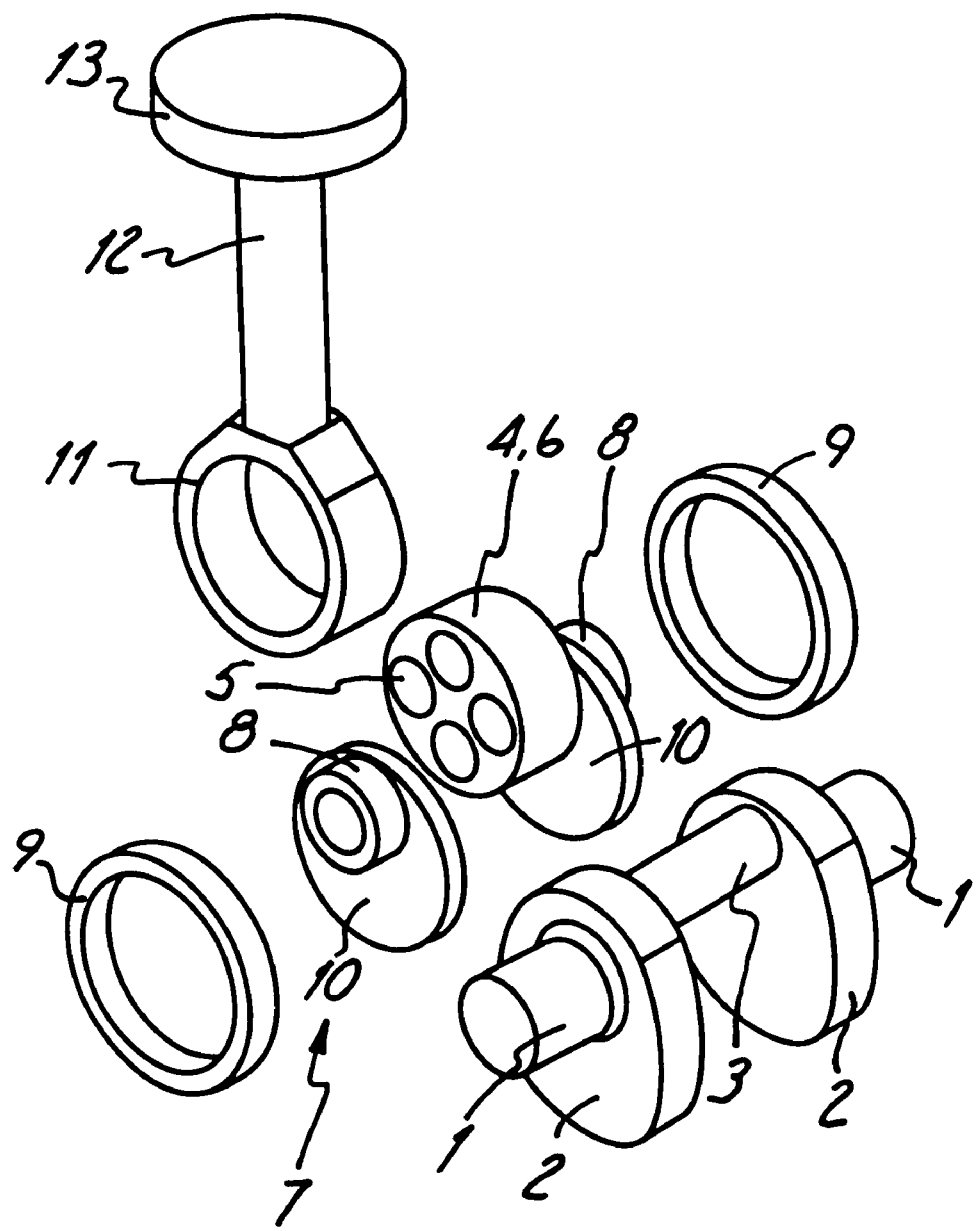
FIG. 3 is a perspective exploded view of a crank-connecting rod mechanism according to the principle of FIGS. 1 and 2.

A second crank 4 is rotatably mounted on first crank pin 3 by means of a bearing (not shown), wherein the hole 5 in the second crank 4 that fits round first crank pin 3 is positioned eccentrically with respect to second crank 4. A second crank pin 6 is formed on second crank 4, which crank pin 6 is not exposed to view in this figure because it coincides with the second crank. As it is, a bearing 11 of a connecting rod 12 (see FIG. 3) surrounds second crank 4, and consequently the axis of second crank 4 will function as the axis of the second crank pin 6. The axis of second crank pin 6 is disposed at a distance $R_2$ from the axis of first crank pin 3.

According to the invention, second crank 4 must rotate about first crank pin 3 in a controlled manner, and to this end rotary means 7 are provided, which are provided in this embodiment with a gear 8 which is fixed to second crank 4 and with a ring gear 9 which may or may not be rotatably connected to the crankcase of the crank-connecting rod mechanism. In the illustrated embodiment, gear 8 is bearing-mounted on first crank pin 3 between first crank 2 and second crank 4 so as to obtain a compact construction. Gear 8 is fitted with a counterweight 10 which functions to balance the mechanism.

The engagement between gear 8 and ring gear 9 and the presence of gear 8 on first crank pin 3 ensure that gear 8 will roll over ring gear 9 upon rotation of shaft 1 and the resulting circular movement of first crank pin 3, therefore, whereby it is rotated in a direction opposed to the direction of rotation of shaft 1, so that the second crank 4 connected to gear 8 on the one hand follows the movement of the first crank pin 3, but in addition makes a rotation in opposite direction. Various movements of the second crank pin 6 or of the bearing-mounted connecting rod 12 thereon can be effected by suitably selecting the radial distances $R_1$ and $R_2$ and a radius $R_3$ of gear 8, and furthermore the initial angular position of the second crank pin 6 with respect to the first crank pin 3.

In the illustrated embodiment, it applies that $R_1=R_2=R_3$. This implies that second crank 4 on first crank pin 3 rotates at the same speed as shaft 1, albeit in opposite direction, while in the illustrated position every horizontal movement of the first crank pin 3 is compensated by the horizontal movement in opposite direction of the second crank pin 6, so that the second crank pin 6 indeed makes a rotary movement but moves vertically up and down thereby.

FIGS. 3 and 4a–i schematically show a practical embodiment of an internal combustion engine, a one-cylinder engine in this embodiment, which comprises such a crank-connecting rod mechanism. A number of the parts which are shown in FIGS. 1 and 2 are used as twin parts, one of each being used on either side of second crank 4 in this embodiment. The drawings demonstrate the great advantages of the use of second crank 4 as second crank pin 6, because the crankshaft can continue now and need not be divided, while this furthermore leads to a very compact construction. Only bearing 11 of connecting rod 12 has a relatively large diameter.

FIGS. 4a–i how the operation of the crank-connecting rod mechanism, wherein it can be clearly recognized that the gear comprising the counterweight 10 rotates in opposite direction at the same rotational speed as first crank 2, and that it makes an exactly vertical movement, due to the use of the same radial distances $R_1$ and $R_2$, with a stroke which equals $2*(R_1+R_2)$. It has already been indicated in the introduction what advantages this may provide, in particular in the case of a two-stroke engine.

It is noted that the vertical movement of connecting rod 12 can also be effected with rotary means other than gear 8 and ring gear 9. Thus it would for example be possible to fit connecting rod 12 or bearing 11 with a guide which prevents connecting rod 12 from moving in lateral or horizontal direction. In this manner the second crank 4 is forced into a vertical path by the connecting rod 12 itself and rotated a fixed rotation with respect to the first crank pin 3. Also other rotary means are conceivable, of course.

Figure 6:
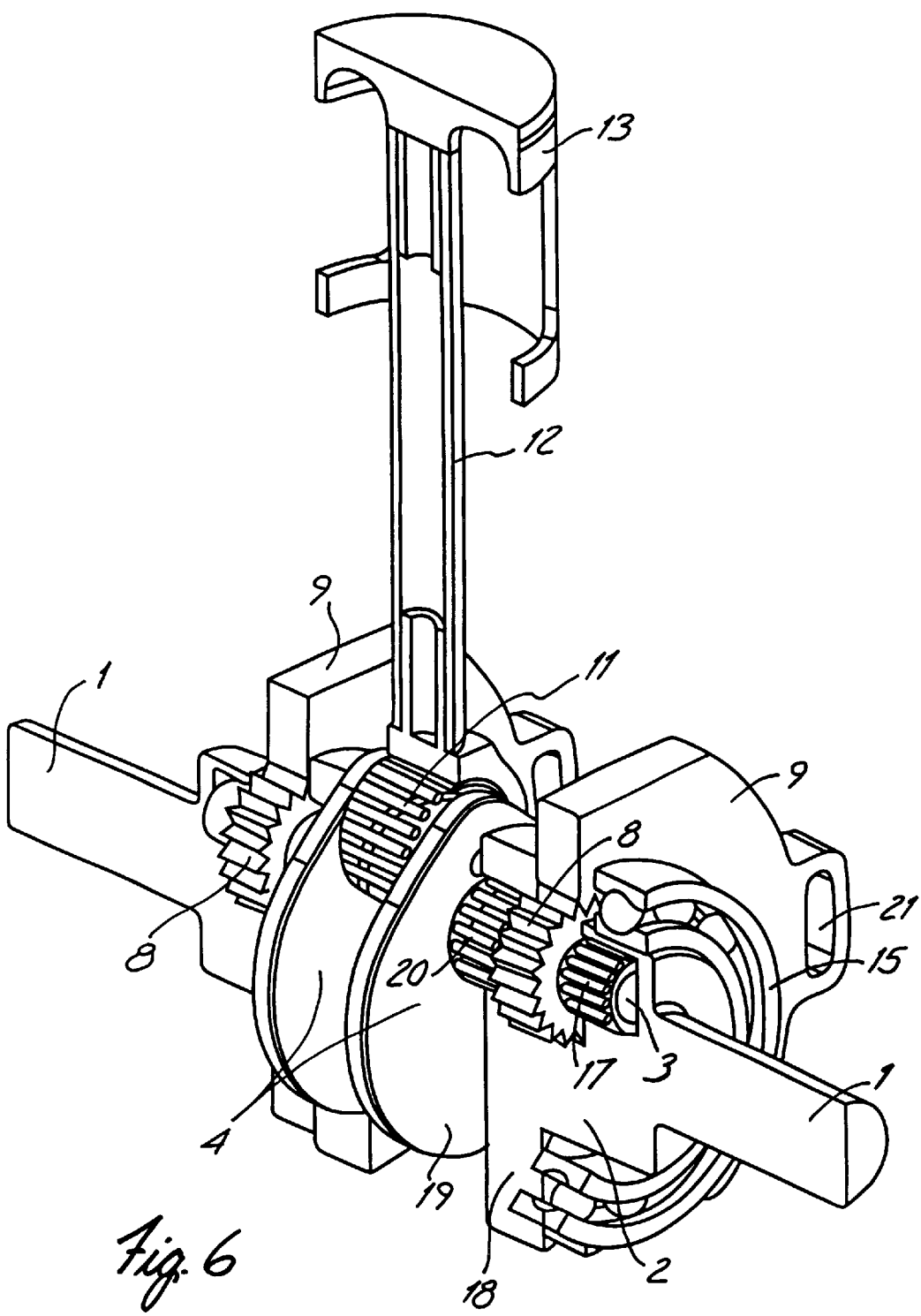
FIG. 6 is a partially cut-away, perspective view of the crank-connecting rod mechanism of FIG. 5.
Figure 7:
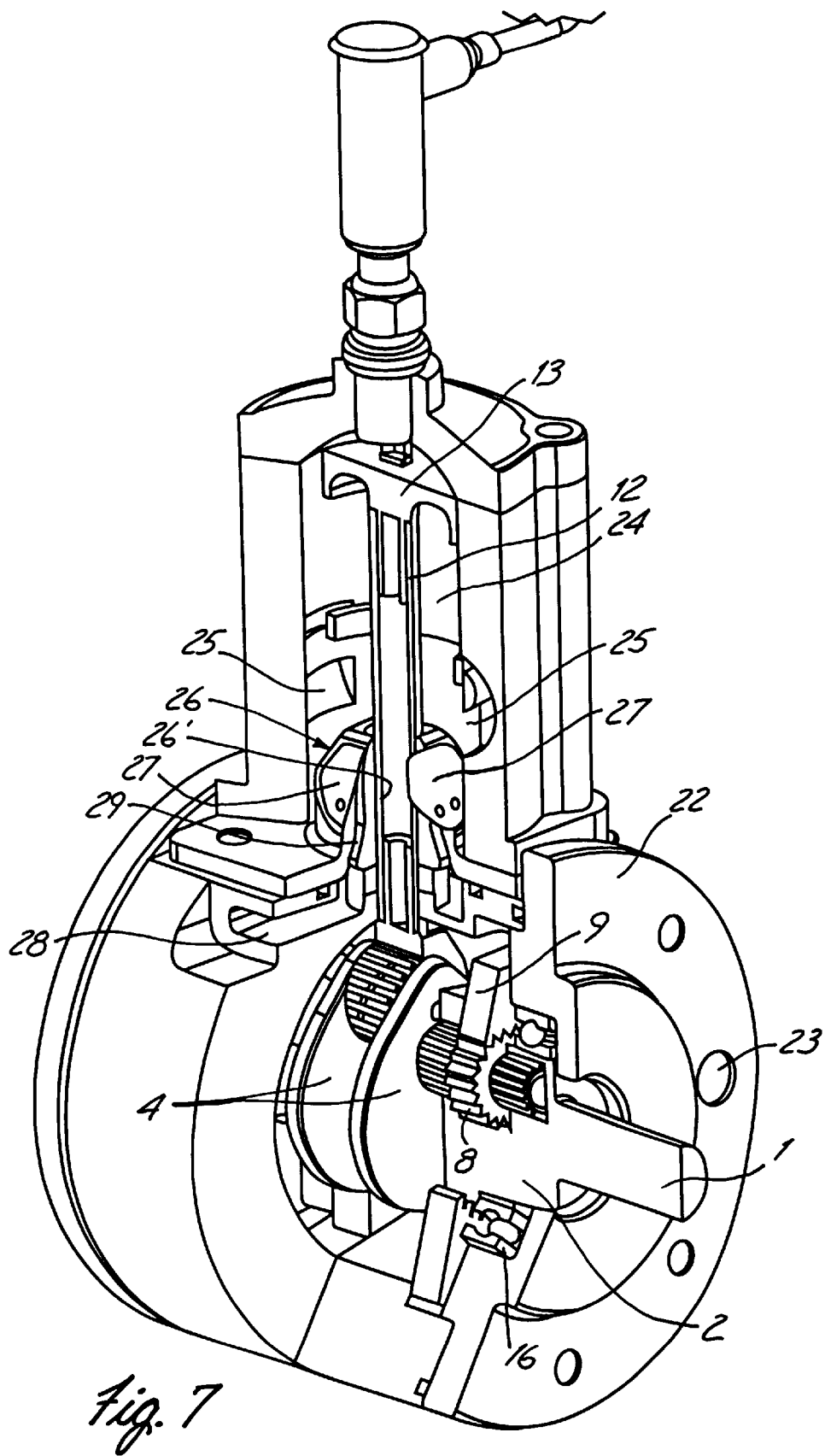
FIG. 7 is a cut-away, perspective view of a two-stroke piston engine comprising the crank-connecting rod mechanism of FIG. 6.

FIGS. 5–7 show a more practical version of the embodiment of the crank-connecting rod mechanism as schematically shown in the preceding figures, wherein also part of the surrounding combustion engine is shown. The crank-connecting rod mechanism is mirror-symmetrical on either side of connecting rod 12. In the figures, first shaft 1 can be distinguished, which shaft is mounted in a bearing 15 (FIGS. 6, 7), for example a ball bearing. Eccentrically positioned in first crank 2 with respect to first shaft 1 is a bearing recess which houses a bearing 17, which functions to receive the first crank pin portions 6' and 6" of the two crankshaft halves in the form of mutually fitting parts so as to assemble the two crankshaft halves into a crankshaft.

The crankshaft is fitted with a first counterweight 18 of first crank pin 2 and a second counterweight 19 of second crank 4. As can be seen in the various figures, gear 8, which makes up the rotary means for first crank pin 3 and which meshes with ring gear 9, is disposed externally of the first counterweight 18, seen in axial direction. The bearing for the first crank pin 3 is positioned quite closely to second crank 4, as a result of which the flexural strain on said first crank pin 3 will remain low. The fact is that first crank pin 3 is supported with a second bearing 20 on the side of gear 8 remote from bearing 17 (see FIGS. 6 and 7). The crankshaft locally exhibits great flexural strength, due to its large diameter, while crankshaft bearing 15 is disposed as closely to the connecting rod 12 as possible.

The figures furthermore show that ring gear 9 is provided with elongated mounting holes 21, which extend concentrically about the central axis of the internal teeth of ring gear 9, and which may be utilized for rotatably mounting ring gear 9. As can be seen in FIG. 7, a crankcase cover 22 of the combustion engine is provided with a closable adjusting hole 23, by means of which fastening screws (not shown) for the ring gear 9 can be tightened and loosened for the purpose of adjusting and fixing ring gear 9. Thus it is possible to effect a readjustment of ring gear 9 so as to obtain the truest possible movement of the crank-connecting rod mechanism, that is, the most rectilinear possible movement of connecting rod 12 of piston 13.

FIG. 7 further shows the mounting of bearing 15 of crankshaft 1 in crankcase cover 22. FIG. 7 furthermore shows the construction of the combustion engine as regards the piston 13 and the parts that co-operate therewith.

Piston 13 moves up and down in a cylinder 24 which is provided with outlet ports (not shown) and scavenge ports 25. FIG. 7 further shows a combined inlet and guide housing 26. Said housing 26 is provided with an internal guide 26' for guiding connecting rod 12. Said guide 26' also seals off the space in cylinder 24 under piston 13, so that a scavenging pressure can be built up in said space. The shape of housing 25 is thereby such that the piston skirt closely surrounds said housing in the bottom dead center of piston 13, as a result of which the false volume in the scavenging space is minimal, thus enabling an optimum scavenging effect.

Also the position of inlet membranes 27, which are mounted on the outside of inlet and guide housing 26, contributes towards minimizing the false volume. The supply of air, and possibly of fuel, takes place from an inlet channel 28 which connects to a channel 29 in housing 26, which channels are in communication with the inlets to be opened and closed by membranes 27.

FIGS. 8 and 9 show another embodiment of the crank-connecting rod mechanism according to the invention, wherein essentially the same parts are used as in the first embodiment according to FIGS. 1–4, but wherein the relative proportions and the positions of parts are different. In this embodiment, for example, the diameter $R_3$ of gear 8 is twice as large as the radial distance $R_1$ of first crank pin 3, as a result of which the rotational speed of second crank 4 is half the rotational speed of first crank 2, while the direction of rotation is opposed thereto. This results in an entirely different movement of second crank pin 6 in comparison with that of the first embodiment. In the first place, the horizontal movement of the first crank pin 3 is no longer compensated, so that connecting rod 12 can no longer reciprocate vertically, thus making it necessary to use a conventional connecting rod 12. Furthermore it can be seen, for example in FIG. 8a, that when first crank pin 3 occupies its uppermost position, second crank pin 6 does not occupy its uppermost position, but its middle position, so that said crank pins are angularly offset 90° with respect to each other in said uppermost position. The second radial distance $R_2$ of second crank pin 6 may be different from first radial distance $R_1$ in this case (due to the fact that it is no longer necessary to provide horizontal compensation) and it is possible to determine the relative proportion of two successive strokes of piston 13. Because second crank 4 moves at half speed, second crank 4 will only make a semi-revolution while crank 2 makes a complete revolution, so that a full cycle of the crank-connecting rod mechanism will only be completed after two revolutions of first crank 2. In the illustrated embodiment, the first and the second stroke of piston 13 ((long) expansion and exhaust stroke) equal $2 \times R_1 + R_2$ (the travel of piston 13 between the positions shown in FIGS. 8a and 8c, or 8c and 8e), while the third and the fourth stroke equal $2 \times R_1 - R_2$ (the travel of piston 13 between the position according to FIGS. 8e and 8g, or 8g and 8i).

As already described in the foregoing, such an embodiment of the crank-connecting rod mechanism according to the invention makes it possible to construct a four-stroke engine in which the compression stroke and the expansion stroke are different from each other, which is done in order to utilize the expansion forces better.

FIG. 9 shows the same construction as FIG. 8, but in this case ring gear 9 is turned clockwise through an angle (in this case 11°) in comparison with the symmetric position as shown in FIG. 8, which angular displacement can be recognized from the position of a point 14 on ring gear 9. In this case the second crank pin 6 does not occupy its middle position when first crank pin 3 occupies its the uppermost position (FIG. 9a), and in the position which is shown in FIG. 9a, wherein the extreme compression position is illustrated, the position of piston 13 is lower than the position according to FIG. 8a, as a result of which the end compression will be lower. Rotation of ring gear 9 thus makes it possible to opt for a lower end compression in full load conditions or when a charging pressure is used (or, in the case of rotation in the other direction, for a higher end compression in part load conditions). The position of the top dead center at the end of the exhaust stroke (FIG. 9c) has been raised in comparison with the position as shown in FIG. 8e, by the same value as the value by which the position of the upper dead center at the end of the compression stroke has been lowered. Also the position of the bottom dead center at the end of the expansion stroke and the inlet stroke will be different, but as a result of the nearly vertical position of the second crank pin 6 in the bottom dead center, angular displacement of the second crank pin 6 about said position will influence the position of the bottom dead center less strongly.

It will be apparent that rotation of ring gear 9 during operation of the combustion engine will be capable of effecting an adjustment of the engine characteristic, so that electronic control of said rotation of ring gear 9 can lead to an optimum operation of the combustion engine in dependence on the particular load condition at that moment.

FIGS. 10 and 11 show a practical embodiment of the crank-connecting rod mechanism of FIGS. 8 and 9. In this embodiment, a very compact construction has been obtained in that ring gear 9 is disposed centrally and the first and the second crank pin 3 and 6 are positioned within said ring gear 9, seen in axial direction. The big end bearing of connecting rod 12 surrounds an eccentric portion 6 of second crank 4, which thus forms second crank pin 6. Second crank 4 is provided on either side of second crank pin 6, and consequently on either side of connecting rod 12, with gears 8 which mesh with each of the internal teeth 9' of ring gear 9. Ring gear 9 is provided between its teeth with a passage 30 for connecting rod 12. Second counterweight 10 is integrated in second crank 4. Facing grooves 31 formed round the central axis of the first crank pin 3 provide accommodation for an outer portion of second crank 4, thus enabling further dimensional minimization.

Figure 12:
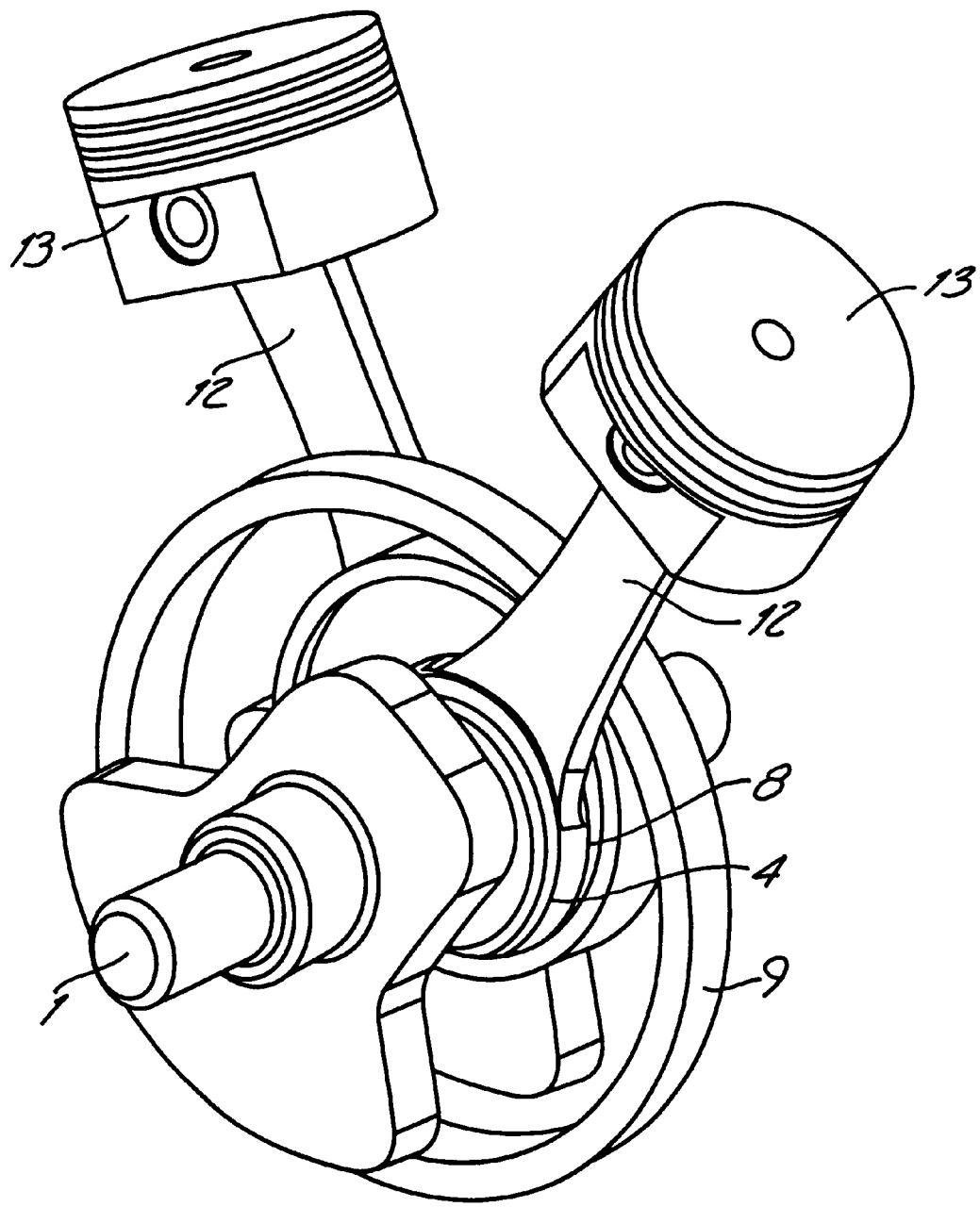
FIG. 12 is a perspective view of a variant of the crank-connecting rod mechanism of FIG. 10 for use in a multi-cylinder engine comprising cylinders arranged in the form of a V or in flat opposite relationship.

FIG. 12 shows another practical embodiment of the crank-connecting rod mechanism which is intended for use in a multicylinder engine whose cylinders are arranged in the form of a V or in flat opposite relationship. In this embodiment, gear 8 is disposed between the two second cranks 4 of the two connecting rods 12, and ring gear 9 is likewise disposed between the two connecting rods 12. In this manner a very compact construction is realized.

Figure 13:
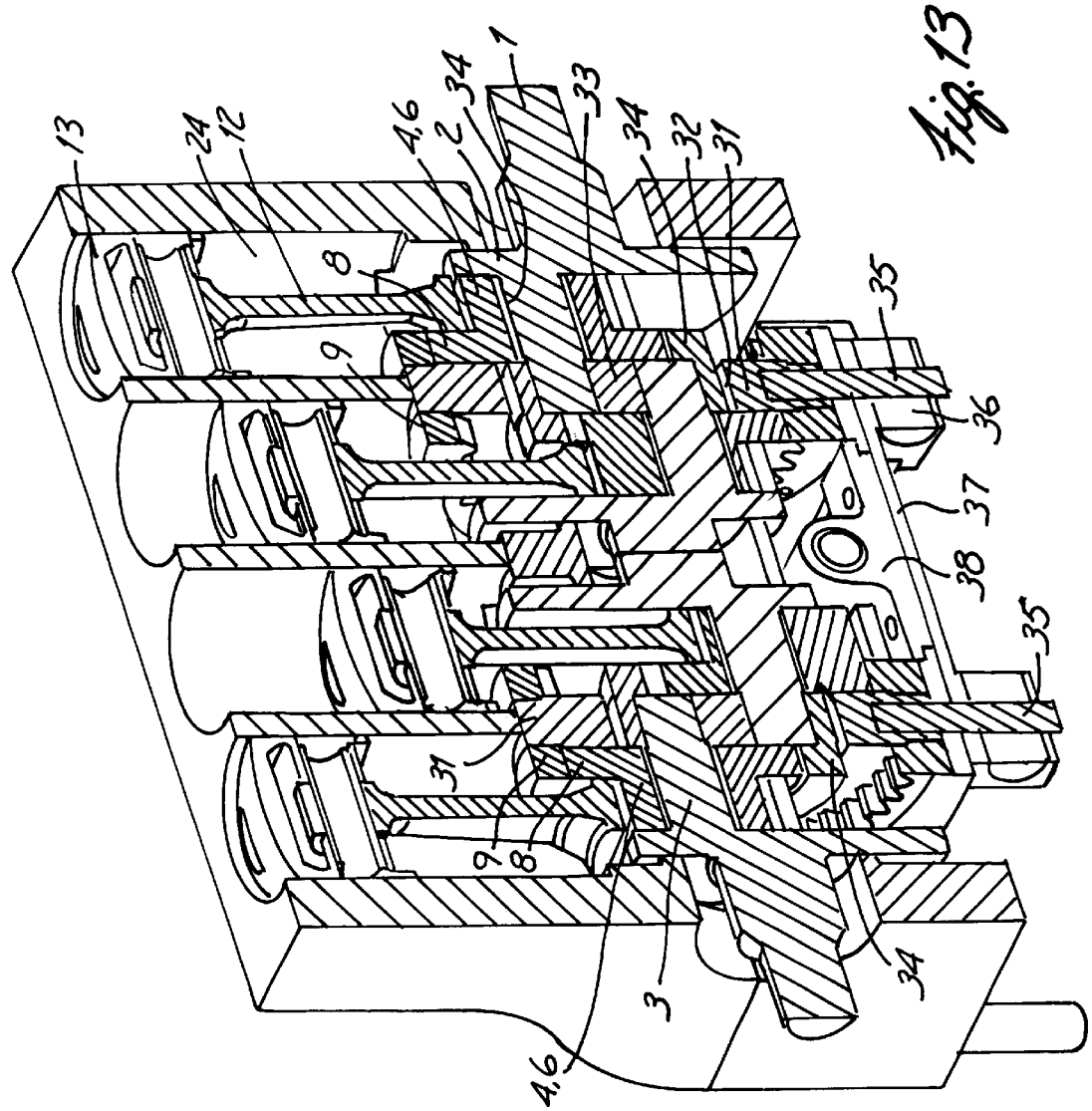
FIG. 13 is a schematic, vertical sectional view of another variant of the crank-connecting rod mechanism according to the invention as used in a four-cylinder four-stroke in-line engine.
Figure 14:
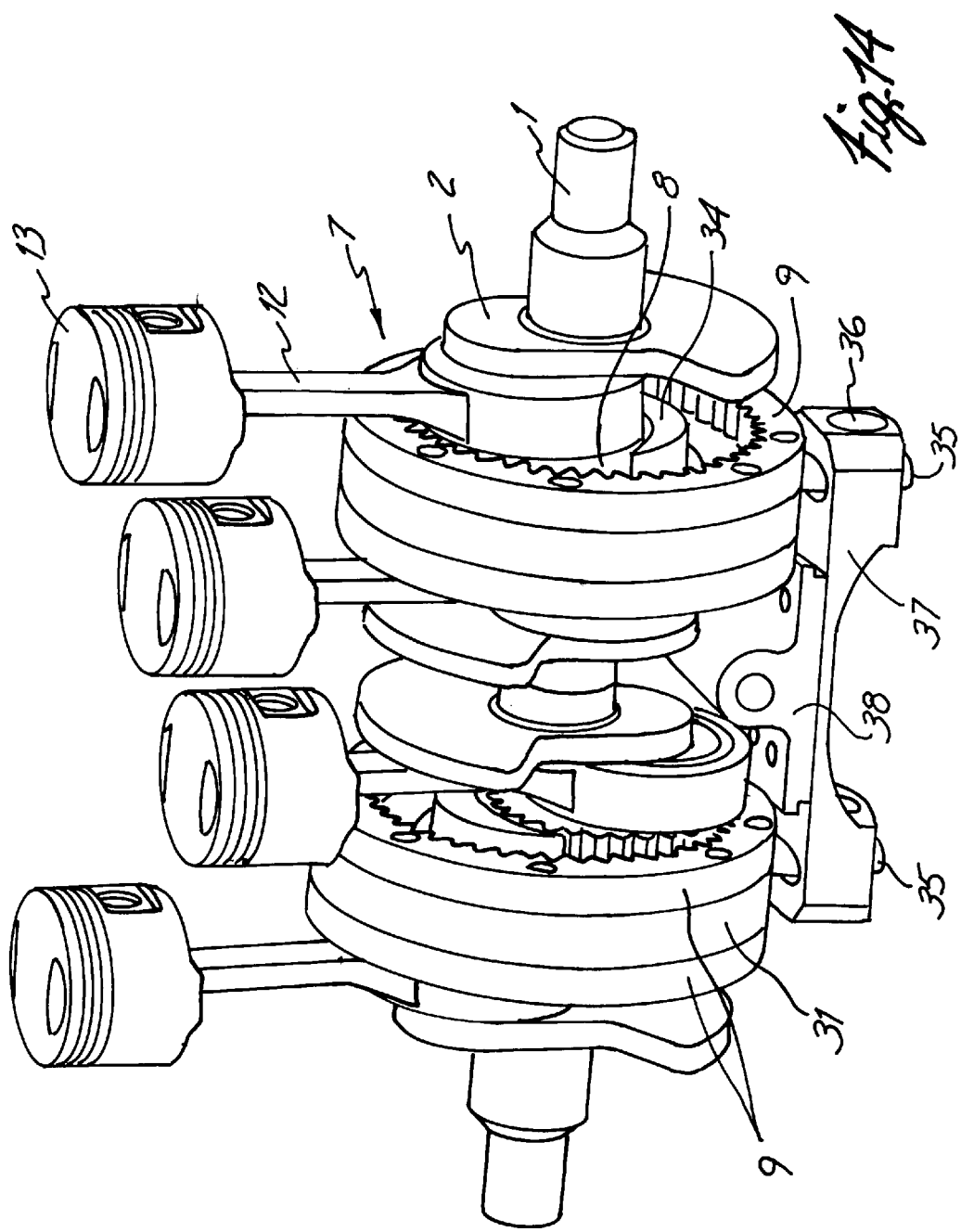
FIG. 14 is a perspective view of the dismounted crank-connecting rod mechanism of FIG. 13.
Figure 15:
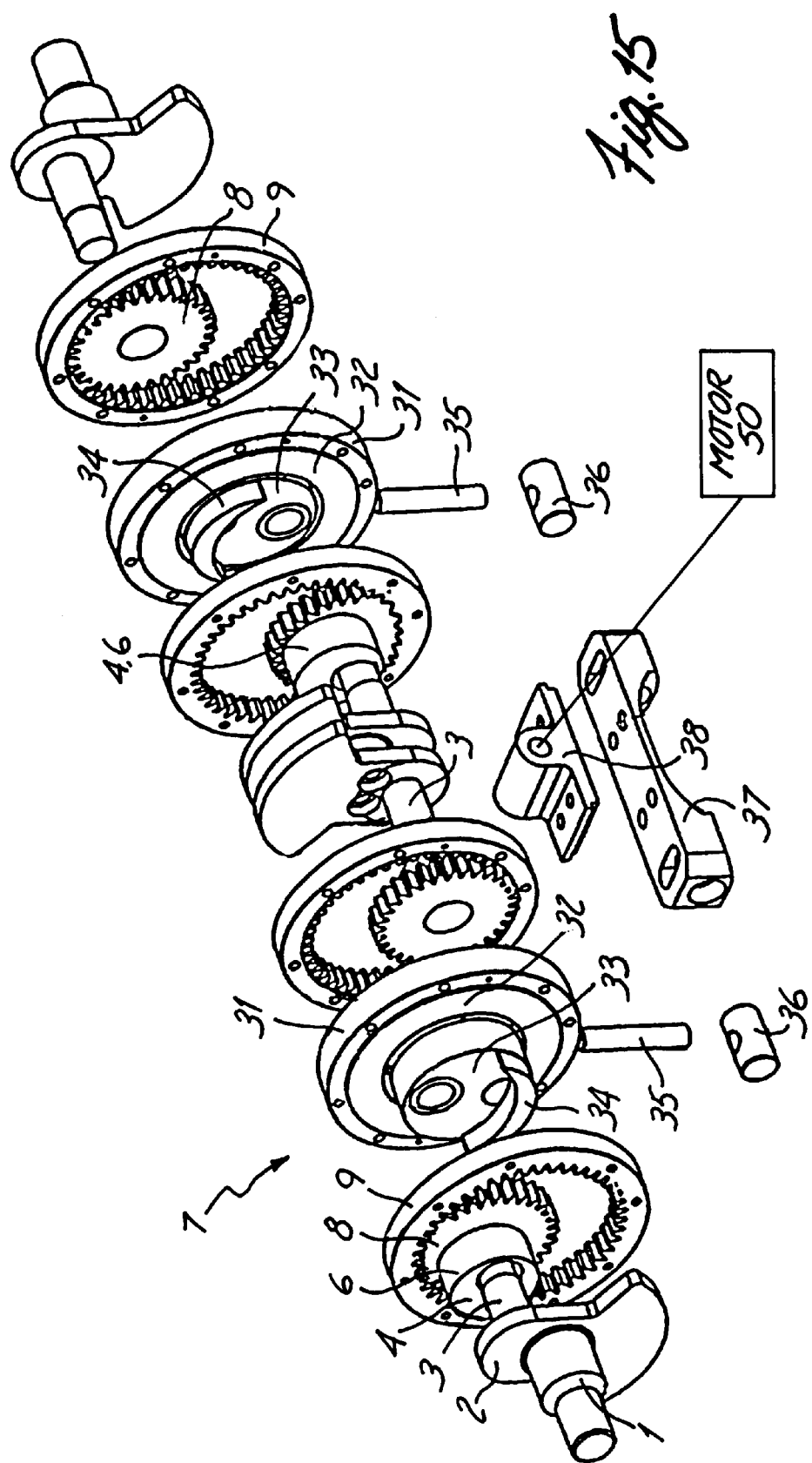
FIG. 15 is an exploded view of the crankshaft of the crank-connecting rod mechanism of FIGS. 13 and 14.

FIGS. 13–15 show another variant in this case for a four-cylinder, four-stroke in-line engine. As is shown in the figures, the rotary means 7 for the two second cranks 4 are mounted between two adjacent cranks 4, which are angularly offset 180° relative to each other. Each second crank 4, has a gear 8 mounted directly adjacently thereto, so that no space is lost between them. Ring gear 9 surrounds gear 8. Present between the adjacent ring gears 9 is an intermediate ring 31, which is rotatably accommodated in the crankcase in this embodiment. The intermediate ring is fixed to the two adjacent ring gears 9 by means of bolts (not shown). Present inside the intermediate ring 31 is a bearing 32, which functions to rotatably support the respective portion 33 of the crankshaft. Said crankshaft portion 33 furthermore carries a counterweight 34, which closely surrounds gear 8 and which does not occupy any additional axial space, therefore.

For the purpose of adjusting rotary means 7 while the combustion engine is running, intermediate ring 31 is provided with a control pin 35, which slidably engages in a bush 36, which bush is rotatably accommodated in a control valve 37 which is used for the two control pins 35 jointly. Control valve 37 may for example be fitted with a spindle nut 38, which cooperates with a spindle which can be rotatably driven, for example by means of a stepping motor 50, which makes it possible to move control valve 37 precisely so as to rotate intermediate ring 31 and thus the ring gears 9 for adjusting the compression end point and the expansion end point of the stroke of pistons 13.

The illustrated construction of the crankshaft and rotary means 7 enables the use of a standard cylinder block, because it is possible to use the same center-to-center distance between pistons of a conventional four-cylinder engine, and only the crankcase needs to be adapted to the new construction of the crankshaft.

From the foregoing it will be apparent that the invention provides a crank-connecting rod mechanism which provides surprising new possibilities for optimization of the operation of a piston engine or other machine without any complicated measures being required.

The invention is not restricted to the above-described embodiments as shown in the drawing, which can be varied in several ways without departing from the scope of the invention. Thus it is also possible to use the invention with crank mechanisms of other machines, such as compressors or other machines wherein rectilinear motion is converted into rotary motion, or conversely. In the case of piston engines, the invention also relates to multi-cylinder engines in various arrangements thereof.

What is claimed is:

1. A crank-connecting rod mechanism for an internal combustion engine or the like having a compression stroke and an expansion stroke, comprising an assembly of:
   a shaft rotating about its axis;
   a first crank fixed to said shaft;
   a crank pin fixed to said first crank, which extends parallel to but at a first radial distance from said shaft;
   a second crank rotatably mounted on the first crank pin, which is fixed to a second crank pin having an axis at a second radial distance from the axis of the first crank pin, wherein the first and second cranks are in such relative positions that, at an uppermost point of the compression stroke, the first crank is positioned at 0° and the second crank is positioned at substantially 90° such that the first and the second cranks are both positioned at substantially 180° at the end of the expansion stroke;
   a connecting rod which is rotatably mounted on the second crank pin; and
   rotary means for causing the second crank to rotate relative to the first crank upon rotation of the shaft, wherein the rotary means is so arranged that the second crank rotates at half the speed, albeit in an opposite direction, of the first crank.

2. The crank-connecting rod mechanism according to claim 1, wherein the first radial distance is equal to or different from the second radial distance.

3. The crank-connecting rod mechanism according to claim 1, wherein said rotary means comprises at least two parts, a first part that is rotatably mounted on the second shaft and fixedly connected to the second crank, and a second part that is in engagement with said first part.

4. The crank-connecting rod mechanism according to claim 3, wherein said first part is a gear and said second part is a internal ring gear that meshes with the first gear, wherein said ring gear is centrally disposed, extending on a side of the connecting rod.

5. The crank-connecting rod mechanism according to claim 4 for use in at least a four-cylinder engine, wherein the the crank-connecting rod mechanism includes the assembly for each cylinder wherein each first gear is disposed directly adjacent to the associated second crank and connecting rod, and wherein each ring gear is disposed on a side of each corresponding connecting rod such that the ring gears are disposed between staggered second cranks of the shaft, and wherein a crankshaft bearing is disposed between the two ring gears of the staggered second cranks.

6. The crank-connecting rod mechanism according to claim 5, wherein two adjacent ring gears are mounted on an intermediate ring that supports said crankshaft bearing.

7. The crank-connecting rod mechanism according to claim 4, wherein said ring gear is maintained in a substantially stationary position during the operation of the crank-connecting rod mechanism.

8. The crank-connecting rod mechanism according to claim 4, wherein said ring gear is adjustable through an angle.

9. The crank-connecting rod mechanism according to claim 8, and further comprising a motor coupled to rotate the ring gear.

10. The crank-connecting rod mechanism according to claim 5, wherein at least one of the first crank and the second crank of each assembly is provided with a counterweight, and wherein said gear is mounted externally of said counterweight, and wherein a bearing is mounted internally of said gear for supporting the first crank pin.

11. The crank-connecting rod mechanism according claim 1, wherein the second crank itself is in the form of a second crank pin, and wherein a central axis of the second crank forms the axis of the second crank pin, and wherein the connecting rod is bearing-mounted about the second crank.

12. The crank-connecting rod mechanism according to claim 4, wherein the gear is mounted on a disc in the form of a counterweight.

13. A piston engine fitted with a crank-connecting rod mechanism according to claim 1.

14. A piston engine fitted with the crank-connecting rod mechanism according to claim 8, and further comprising a crankcase surrounding the crank-connecting rod mechanism, the crankcase including an adjusting hole for adjusting the ring gear from outside the crankcase.

15. A cylinder and piston block assembly comprising:
a cylinder block having at least one cylinder;
a piston movable in each cylinder wherein displacment of the piston includes a compression stroke and an expansion stroke; and
for each piston, an assembly comprising:
a shaft rotating about its axis;
a first crank fixed to said shaft;
a crank pin fixed to said first crank, which extends parallel to but at a first radial distance from said shaft;
a second crank rotatably mounted on the first crank pin, which is fixed to a second crank pin having an axis at a second radial distance from the axis of the first crank pin, wherein the first and second cranks are in such relative positions that, at an uppermost point of the compression stroke, the first crank is positioned at 0° and the second crank is positioned at substantially 90° such that the first and the second cranks are both positioned. at substantially 180° at the end of the expansion stroke;
a connecting rod connected to the pistion and rotatably mounted on the second crank pin; and
a rotary means for causing the second crank to rotate relative to the first crank upon rotation of the shaft, wherein the rotary means is so arranged that the second crank rotates at half the speed, albeit in an opposite direction, of the first crank.

16. The block assembly according to claim 15, wherein the first radial distance is equal to or different from the second radial distance.

17. The block assembly according to claim 15, wherein said rotary means comprises at least two parts, a first part that is rotatably mounted on the second shaft and fixedly connected to the second crank, and a second part that is in engagement with said first part.

18. The block assembly according to claim 17, wherein said first part is a gear and said second part is a internal ring gear that meshes with the first gear, wherein said ring gear is centrally disposed, extending on a side of the connecting rod.

19. The block assembly according to claim 17, wherein the block assembly comprises a plurality of cylinders and pistons, and wherein said first part of each rotary means is a gear and said second part of each rotary means is an internal ring gear that meshes with the first gear, wherein said ring gear is disposed on a side of each corresponding connecting rod such that the ring gears are disposed between staggered second cranks of the shaft.

20. The block assembly according to claim 19, wherein the block assembly comprises at least four cylinders, wherein each first gear is disposed directly adjacent to the associated second crank and connecting rod, and further comprising a crankshaft bearing disposed between the two ring gears of the staggered second cranks.

21. The block assembly according to claim 20, wherein two adjacent ring gears are mounted on an intermediate ring, and wherein the intermediate ring supports said crankshaft bearing.

22. The block assembly of claim 21 wherein the intermediate bearing rotates the ring gears during operation.

* * * * *